Feb. 6, 1951     M. P. WINTHER ET AL     2,540,639
TRANSMISSION
Filed May 11, 1945     8 Sheets-Sheet 2
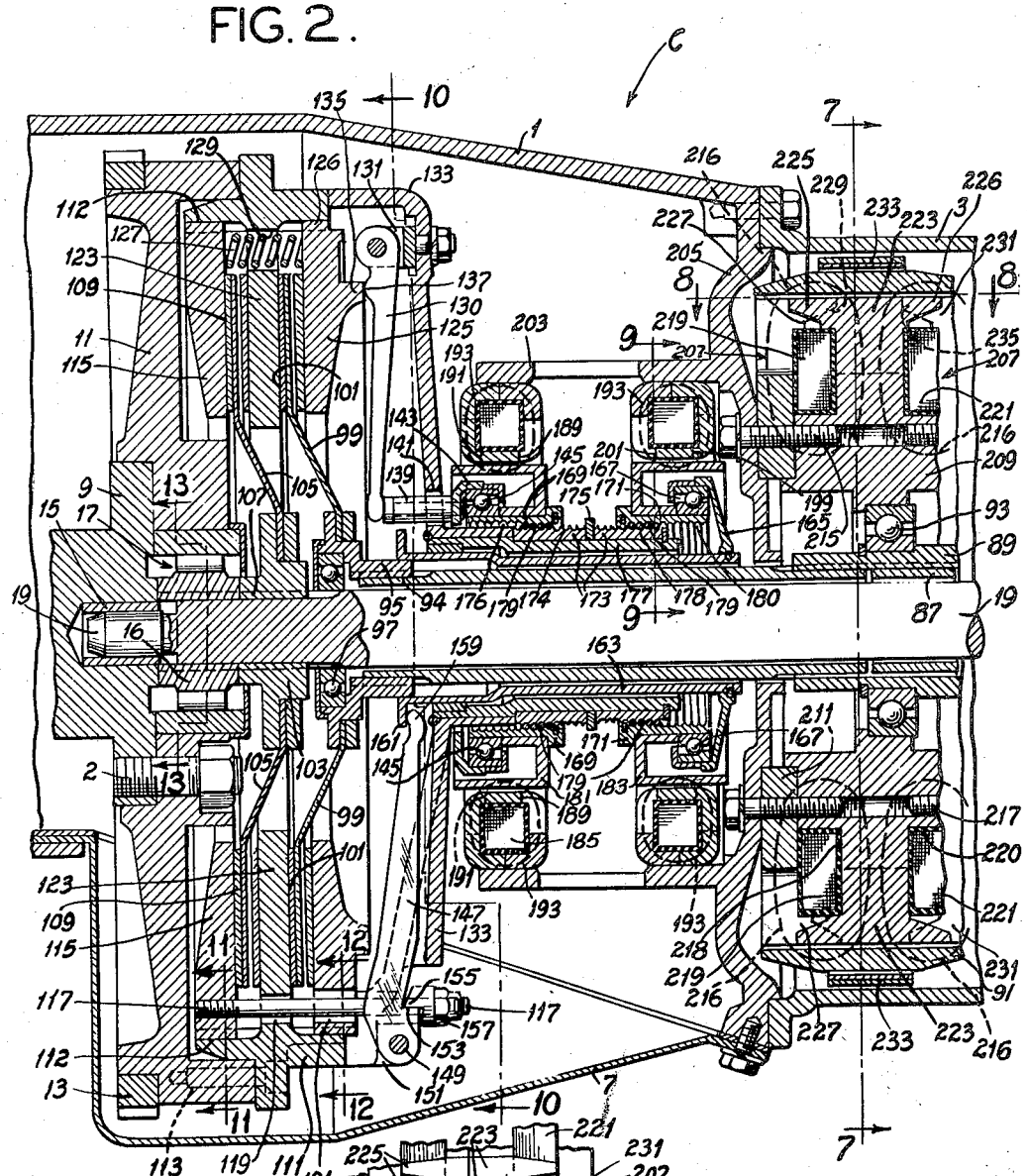
FIG. 2.
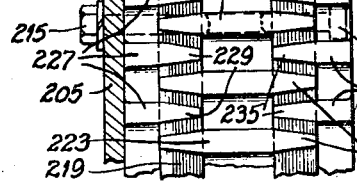
FIG. 8.
Martin P. Winther,
Anthony Winther,
Inventors.
Haynes and Koenig
Attorneys.

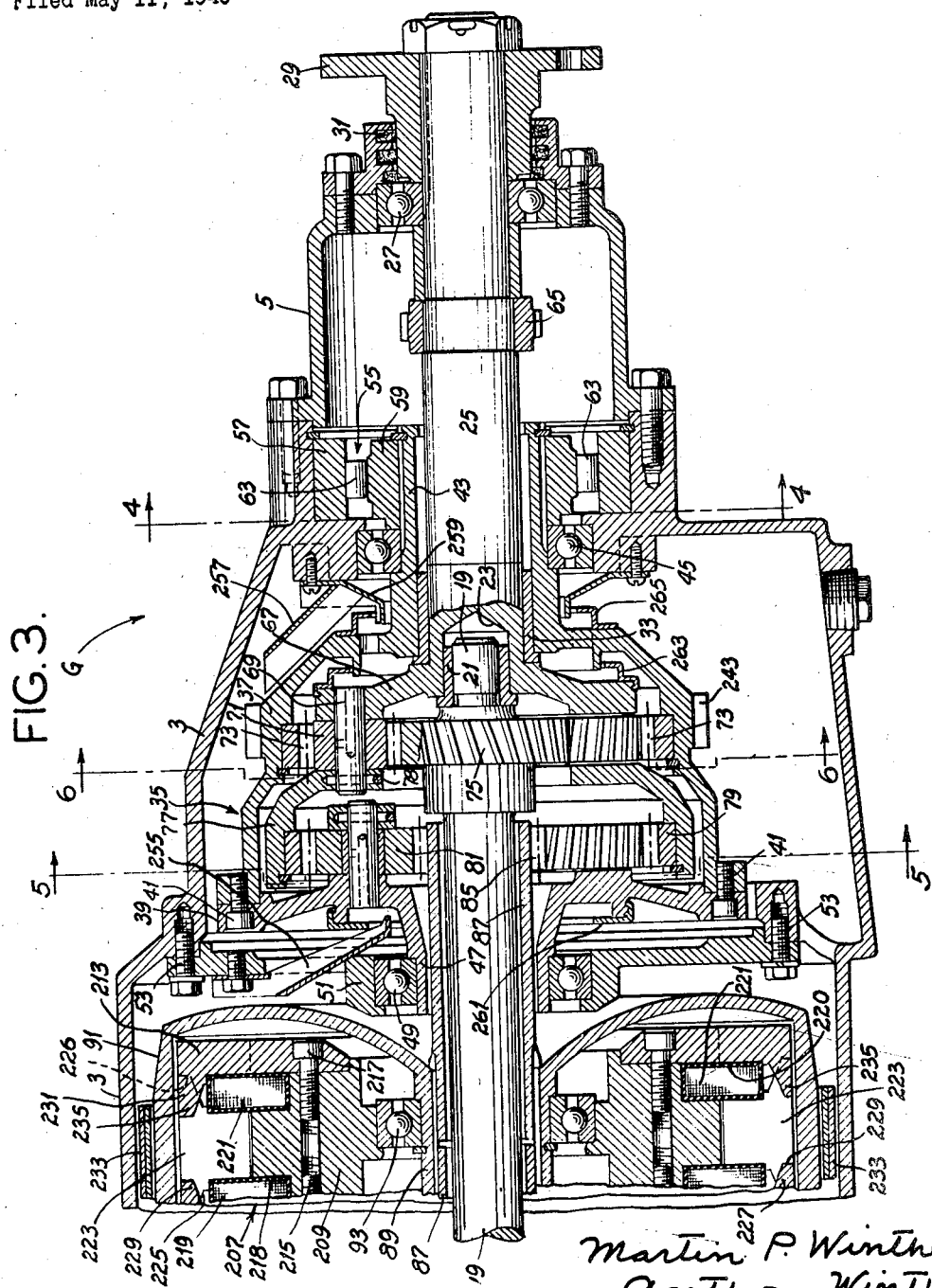

Feb. 6, 1951 — M. P. WINTHER ET AL — 2,540,639
TRANSMISSION
Filed May 11, 1945 — 8 Sheets-Sheet 4
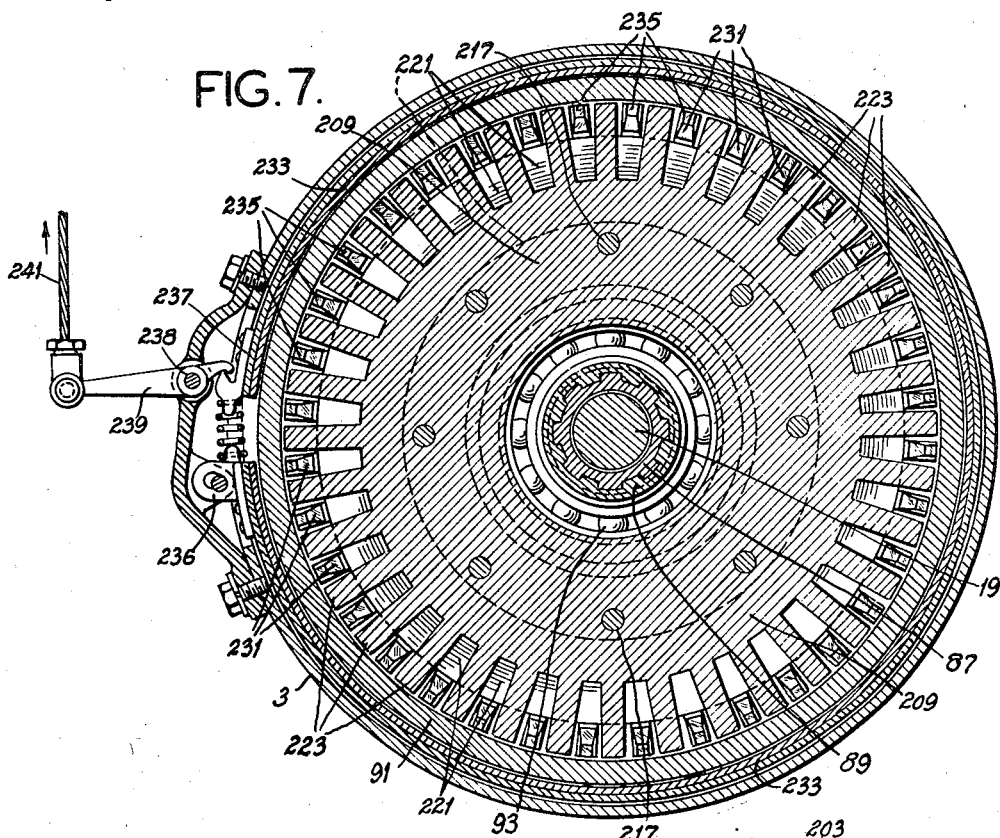
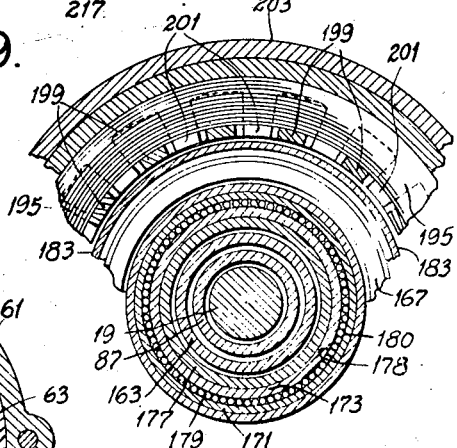
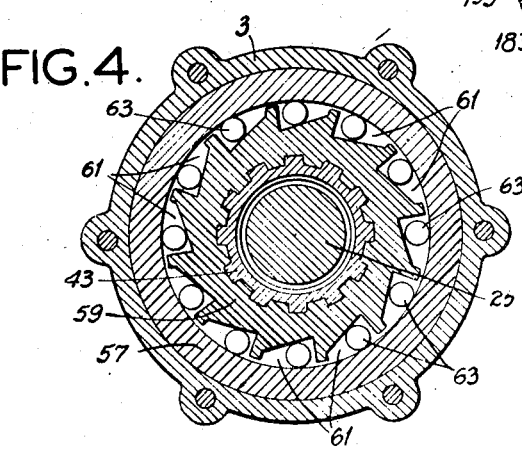
Martin P. Winther,
Anthony Winther,
Inventors
Haynes and Koenig
Attorneys

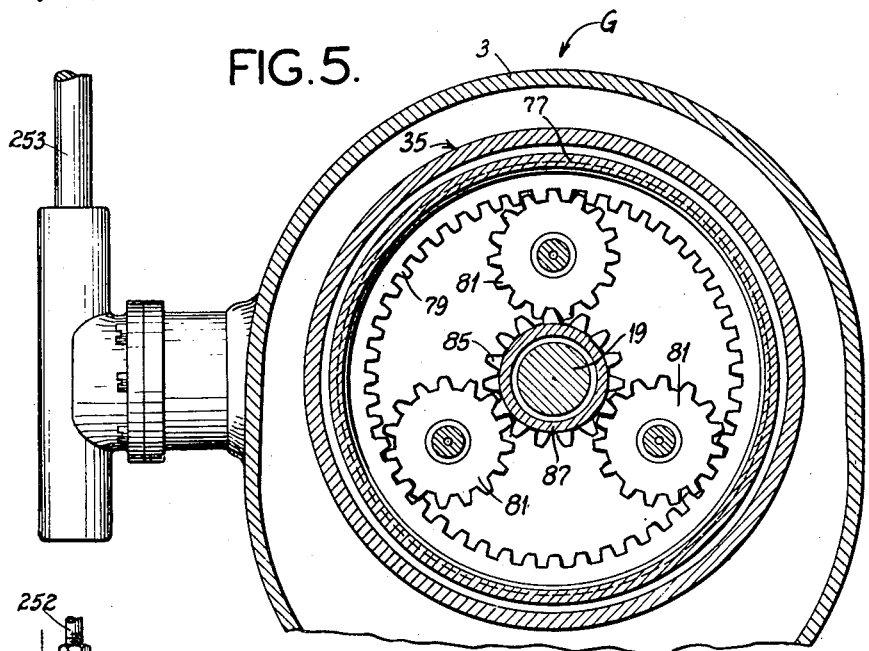
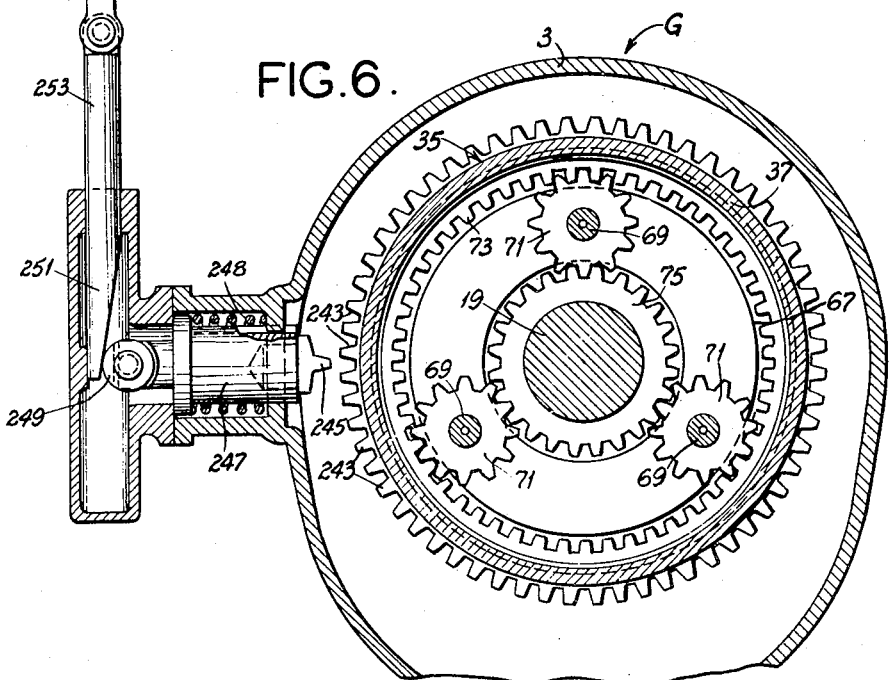

Feb. 6, 1951 — M. P. WINTHER ET AL — 2,540,639

TRANSMISSION

Filed May 11, 1945 — 8 Sheets-Sheet 6

Martin P. Winther
Anthony Winther
Inventors.
Haynes and Koenig
Attorneys.

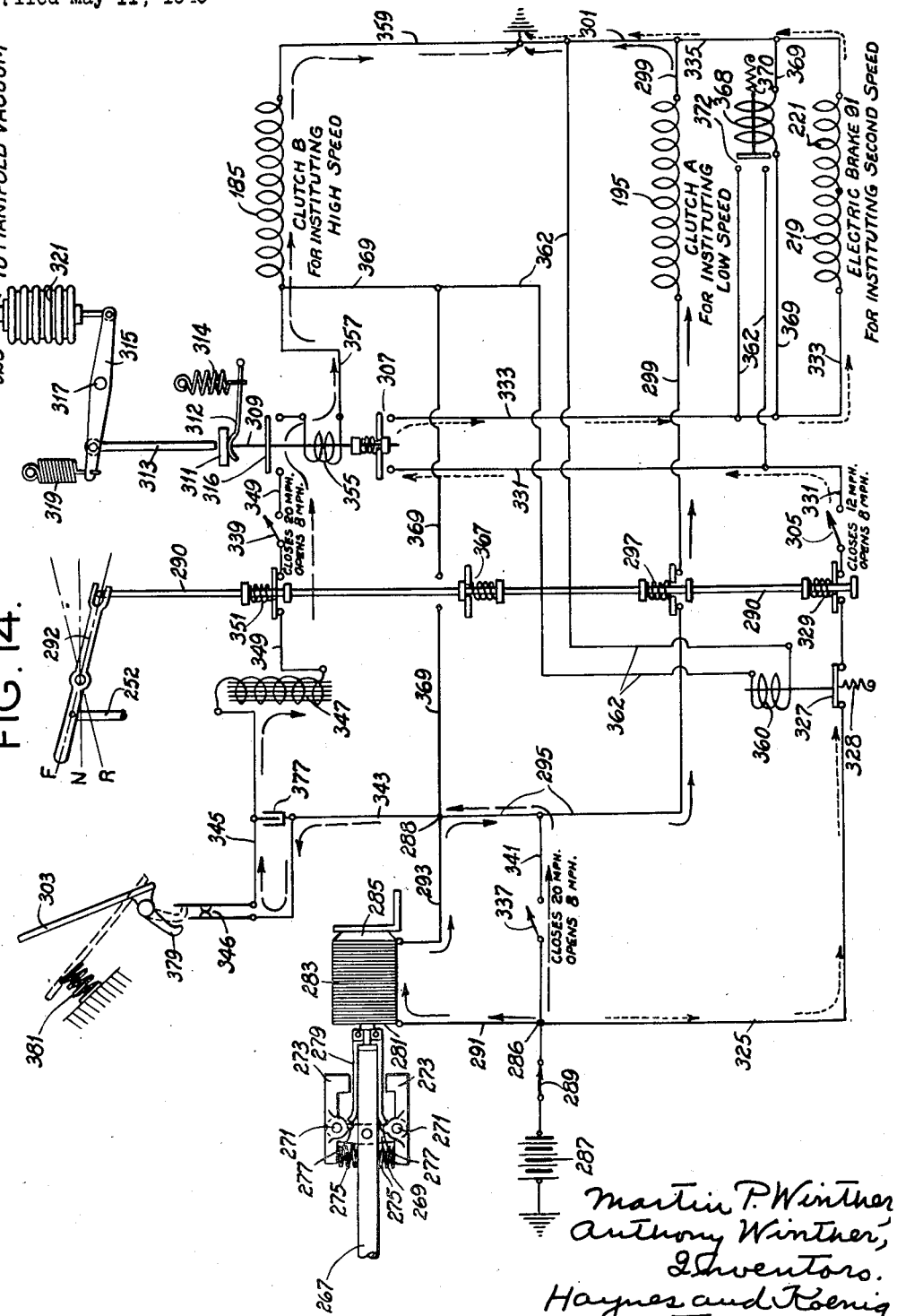

Feb. 6, 1951  M. P. WINTHER ET AL  2,540,639
TRANSMISSION
Filed May 11, 1945  8 Sheets-Sheet 8

FIG. 15.

SEE FIGS. 1, 2 AND 3.

| ELEMENT | LOW | SECOND OR INTERMEDIATE | HIGH | REVERSE | NEUTRAL |
|---|---|---|---|---|---|
| COIL 195 | ENERGIZED | ENERGIZED | ENERGIZED | DEENERGIZED | DEENERGIZED |
| CLUTCH A | CLOSED | CLOSED | CLOSED | OPEN | OPEN |
| COIL 185 | DEENERGIZED | DEENERGIZED | ENERGIZED | ENERGIZED | DEENERGIZED |
| CLUTCH B | OPEN | OPEN | CLOSED | CLOSED | OPEN |
| COILS 219,221 | DEENERGIZED | ENERGIZED | DEENERGIZED | DEENERGIZED | DEENERGIZED |
| ELEC. BRAKE DRUM 91 | FREE | SLOWED TOWARD LOCKING | FREE | FREE | FREE |
| TEETH 243 AND DOG 245 | UNLOCKED | UNLOCKED | UNLOCKED | LOCKED | UNLOCKED |
| ONE-WAY BRAKE 55 | LOCKED COUNTER CLOCKWISE | UNLOCKED CLOCKWISE | UNLOCKED CLOCKWISE | NO FUNCTION | NO FUNCTION |
| SWITCH 297 | CLOSED | CLOSED | CLOSED | OPEN | OPEN |
| SWITCH 329 | CLOSED | CLOSED | CLOSED | OPEN | OPEN |
| SWITCH 351 | CLOSED | CLOSED | CLOSED | OPEN | OPEN |
| SWITCH 367 | OPEN | OPEN | OPEN | CLOSED | OPEN |
| SWITCH 305 | OPEN | CLOSED | CLOSED | NO FUNCTION | OPEN |
| SWITCHES 337 AND 339 | OPEN | OPEN | CLOSED | NO FUNCTION | OPEN |
| SWITCH 327 | CLOSED | CLOSED | OPEN | OPEN | CLOSED |
| SWITCH 372 | OPEN | CLOSED | OPEN | OPEN | OPEN |
| SWITCH 316 | NO FUNCTION | CLOSED | CLOSED | NO FUNCTION | OPEN |
| SWITCH 307 | NO FUNCTION | CLOSED | CLOSED | NO FUNCTION | OPEN |

MANUALLY CONTROLLED / SPEED GOVERNOR SWITCHES / MAGNETIC HOLDING SWITCHES / VACUUM SWITCHES

SEE FIG. 14.

Martin P. Winther
Anthony Winther,
Inventors.
Haynes and Koenig
Attorneys.

Patented Feb. 6, 1951

2,540,639

UNITED STATES PATENT OFFICE 2,540,639

TRANSMISSION

Martin P. Winther, Waukegan, and Anthony Winther, Kenosha, Wis., assignors to Martin P. Winther, trustee Application May 11, 1945, Serial No. 593,236

24 Claims. (Cl. 74—472)

This invention relates to transmissions, and with regard to certain more specific features, to automatic transmissions, particularly for automotive use but having other uses as well.

Objects

Among the several objects of the invention may be noted the provision of a multi-speed automatic transmission which can readily be designed substantially to duplicate any practical torque ranges required and which lends itself to practical inclusion with any ordinary overdrive arrangement; the provision of a transmission of the class described in which torque changes occur smoothly and without intervening parasitic drag action and without periods of lost torque; the provision of a transmission of the class described which when connected provides a substantially positive driving coupling; the provision of a transmission of the class described which is of simple and compact form but does not sacrifice generous clutch sizes where such are used; and the provision of a transmission of this class which is economical to build and easy to maintain. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Drawings

In the accompanying drawings, in which is illustrated one of various possible embodiments of the invention, Fig. 1 is a longitudinal section of the mechanical elements of an entire transmission embodying the invention;

Fig. 2 is an enlarged longitudinal section of a clutch section C of Fig. 1;

Fig. 3 is an enlarged longitudinal section of a gear section G of Fig. 1;

Fig. 4 is a cross section taken on line 4—4 of Fig. 3;

Fig. 5 is a vertical section taken on line 5—5 of Fig. 3;

Fig. 6 is a vertical section taken on line 6—6 of Fig. 3;

Fig. 7 is a vertical section taken on line 7—7 of Fig. 2;

Fig. 8 is a horizontal section taken on line 8—8 of Fig. 2;

Fig. 9 is a vertical section taken on line 9—9 of Fig. 2;

Fig. 12 is a vertical detail section taken on line 12—12 of Fig. 2;

Fig. 14 is a diagrammatic view of certain electrical and mechanical controls;

Fig. 15 is a chart of operations of the elements which are most significant to the description; and, Fig. 16 is a schematic drawing of essential parts of a compound epicyclic or planetary gear train viewed substantially from line 5—5 of Fig. 3, in which only the pitch circles of a basic set of gears are shown, instead of their teeth.

Similar reference characters indicate corresponding parts throughout the several views of the drawings.

Description of electro-mechanical means

Hereinafter all references to clockwise and counterclockwise rotations assume that Figs. 1, 2, 3 and 16 are being viewed from the left, which is the engine or front side of the transmission.

In Figs. 5 and 6 are shown all of certain planetary or epicyclic gears 71 and 81, but in schematic Fig. 16 only one basic set of each of these is shown, since the remainder are multiplied only for reasons of balance and strength.

Figure 1:
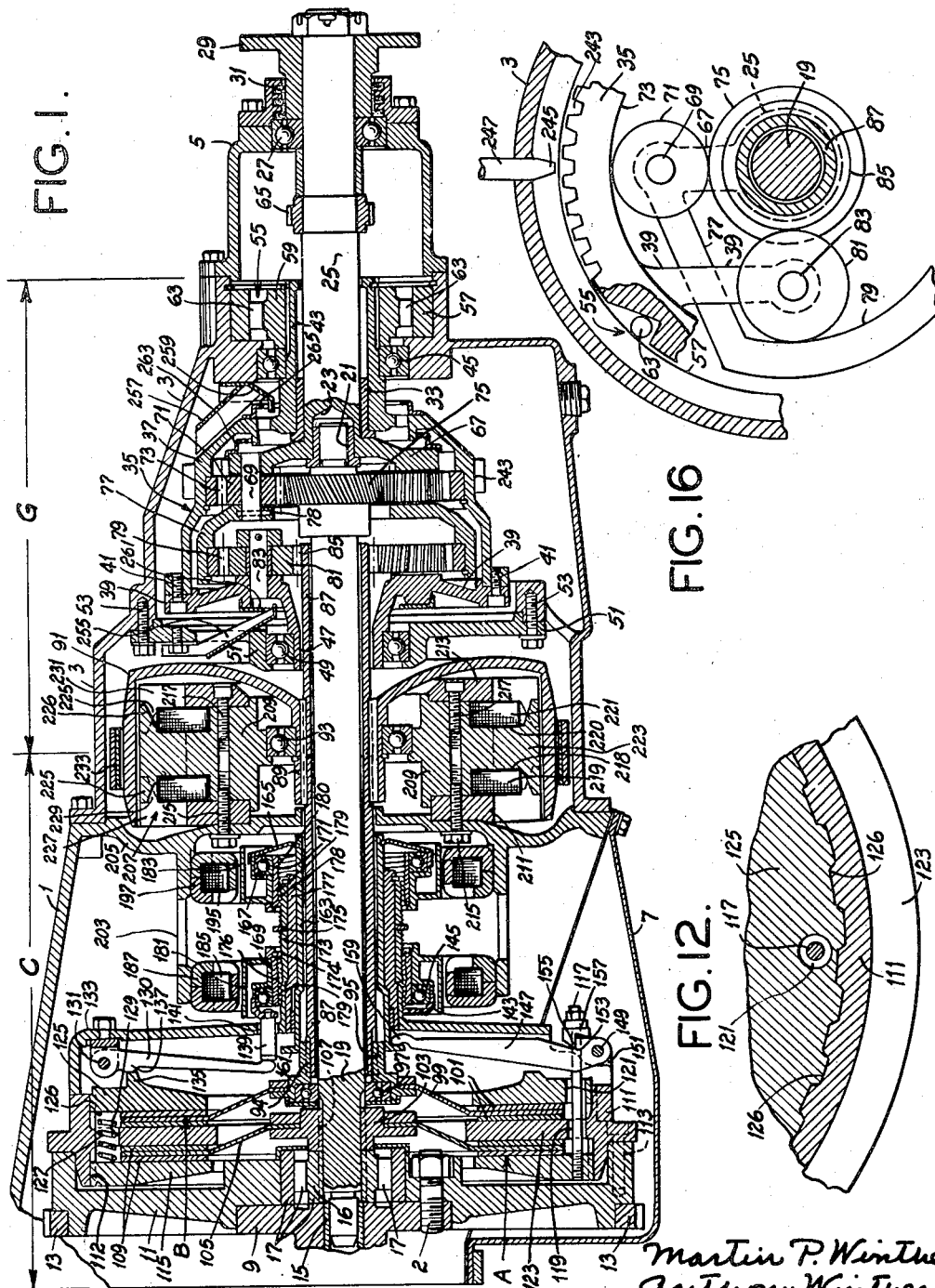

Referring first more particularly to Fig. 1, the casing of the transmission is indicated in three sections 1, 3 and 5. The bottom of section 1 is enclosed by an attached pan 7. The casing section 1 attaches to the rear of the crankcase of an automotive engine or like prime mover. The rear end of the crankshaft of said engine includes the usual flange 9 to which is bolted a flywheel 11 (see bolts 2). This member 11 carries the usual ring gear 13 adapted to be engaged by an engaging and disengaging starting pinion, but since the starter construction forms no part of the invention it will not further be described.

Figure 13:
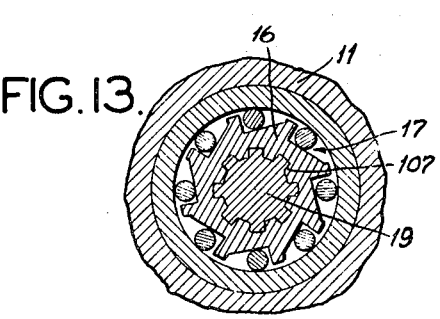
Fig. 13 is a vertical section taken on line 13—13 of Fig. 2.

Piloted for rotation in a center sleeve bearing 15 of the flywheel 11 is in the left end of a low-speed shaft 19. Splined near the end of shaft 19 is the inner race 16 of an overrunning clutch 17. This clutch is detailed in Fig. 13. It allows the flywheel 11 to overrun the shaft 19 clockwise but does not allow the shaft to overrun the flywheel clockwise. Thus the engine may be cranked from shaft 19 if necessary, as well as from the starter gear 13.

On its right-hand end the shaft 19 is piloted in a sleeve bearing 21, the latter being located in a counterbore 23 of a driving quill 25. This quill 25 at its right-hand end is, by means of a ball bearing 27, supported within the section 5 of the casing. Outside of this bearing this quill has keyed to it a coupling flange 29 for fastening it to the drive shaft assembly (not shown) of the vehicle on which the transmission is located. A packing gland 31 functions as a grease retainer and means for excluding foreign material from the outside. The left-hand end of the quill 25 is supported within a sleeve bearing 33, the latter being supported in a rotary gear cage member 35, made in two parts 37 and 39 bolted together as shown at 41. This outer cage has a sleeve 43 at its rear end which is supported upon a ball bearing 45 in the case section 3. It also has a sleeve 47 at its left end, supported in a ball bearing 49. This bearing 49 is located upon an annular support 51 bolted at 53 to the inside of case section 3. Attached within the cage 35 is an internal gear 73.

On the right-hand end of the sleeve 43 of the outer cage 35 is a one-way brake indicated generically by the numeral 55 (Fig. 4). This brake is constituted by an outer stationary race 57 in the section 3 and an inner race 59 splined to 43 and having wedge-shaped sections 61 in which are brake rollers 63. The arrangement is such that, viewed from the left, the outer cage 35 may rotate clockwise but never counterclockwise. A gear shown at numeral 65 is for an auxiliary take-off drive for operating certain centrifugal governor switches 305, 337 and 349, to be mentioned below.

The quill 25, which it will be recalled is rotary in the bearing 33 within the outer cage 35, is provided at its left end with a three-armed planetary support 67 from which extends supporting gudgeons 69 for a set of planetary gears 71. The gears 71 are rotary on the gudgeons 69. Exteriorly they mesh with an annular gear 73 which is attached to the interior of the outer cage 35. Interiorly the planetary gears 71 mesh with a central sun gear 75, the latter being carried on the right-hand end of the shaft 19. Shaft 19 hereafter will be called the low-speed shaft.

The pins 69 also support an annular, bell-shaped member 77, pin fastenings 78 being employed for the purpose. This member 77 with the arms 67 may be called an inner planetary cage, the members 67 and 77 rotating together as a unit.

The bell member 77 carries an annular gear 79 which meshes with a set of planetary gears 81 rotary on gudgeon pins 83 extending from the part 39 of the rotary outer cage 35. The gears 81 mesh with a central sun gear 85 which is formed on the end of a drive tube 87. Tube 87 will hereafter be called the second-speed tube. At its central portion this tube 87 is keyed to the central hub 89 of an electric brake drum 91, later to be described. This central hub 89 is supported in a ball bearing 93. The support for the outer race of the ball bearing 93 is in a fixed member 209, other functions of which will later be described. The extreme left end of the tube 87 is splined at 94 with a hub 95 with enough looseness of fit to allow for slight axial movement of the hub 95 without relative rotary movement. The hub 95 has a rotary bearing relative to the shaft 19 through a sliding ball bearing 97. Attached to the outside of the hub 95 is a clutch plate 99 which peripherally carries friction facings 101.

A second hub 103 carries a clutch plate 105. Hub 103 is splined to the shaft 19 at 107 for axial movement without relative rotary movement. This second clutch plate has friction facings 109.

Both clutch plates 99 and 105 are housed within a ring 111 bolted to the flywheel 11 as indicated at 113. This ring 111 includes an integral ring 123. Splined to the left end and on the interior of the ring 111 is an axially movable pressure plate 115. The splines show at 112 (see Fig. 11). Although axially movable, this plate 115 is rotary with the ring 111. Splined at the right within ring 111 is a second pressure plate 125. The splines for this show at 126 (see Figs. 10 and 12).

From the pressure plate 115 extends a group of (three) pins 117 which pass through holes 119 in 123 and slots 121 in 125 and 133. A group of compression springs 127 traversing suitable passages 129 in the ring 123 serve to bias apart the pressure plates 115 and 125, away from the clutch plates 105, 99.

Figure 10:
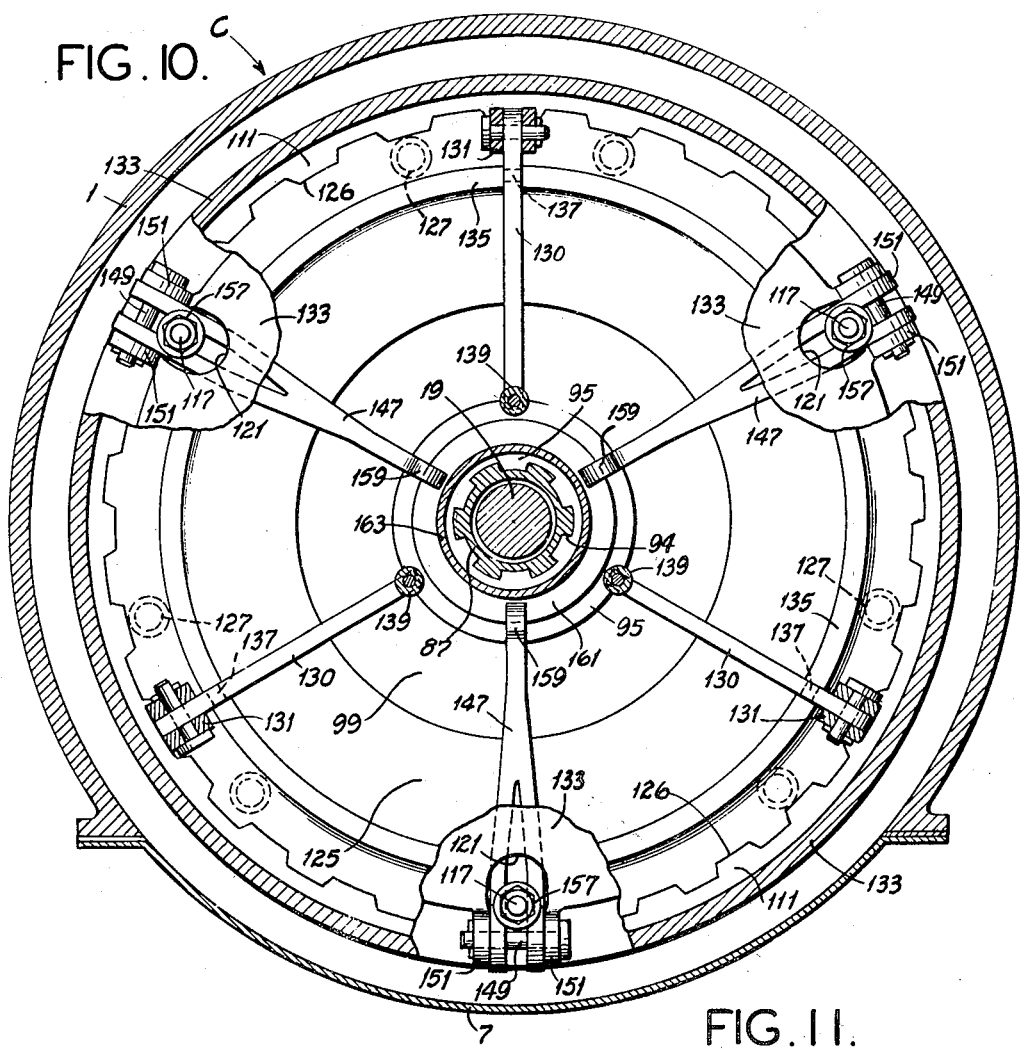
Fig. 10 is a vertical section taken on line 10—10 of Fig. 2.
Figure 11:
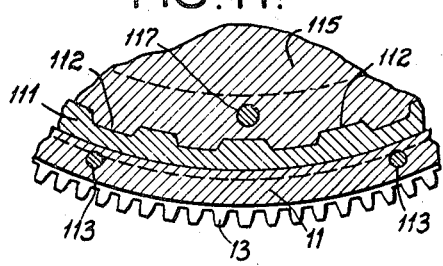
Fig. 11 is a vertical detail section taken on line 11—11 of Fig. 2.

The ring 125 may be pushed so as to force clutch plate 99 against 123 by action of several (three) levers 130 pivoted at clevises 131 which are bolted to a housing member 133 fastened to the ring 111 and rotary therewith (see Fig. 10). Anvil means 135 on the ring 125 receives pressure from the levers 129 through cams 137 on the levers.

The clutch levers 130 are angularly controlled from pins 139 which extend through openings 141 in the housing 133. These pins 139 are supported upon a ring 143 which is carried on the outer race of a ball bearing 145. Thus the levers 130, control pins 139 and ring 143 are all rotary, but, as will be seen, the control pins 139 may be moved axially for operating the levers. Thus when the levers 130 are moved clockwise (Fig. 1), they press the ring 125 toward the stationary ring 123, and under pressure grip the clutch disc 99.

A second set of levers 147 is used for axially moving the pins 117, and hence the ring 115 (see Fig. 10). This is accomplished by pivoting the levers 147 at 149 on suitable extensions 151 from the cover 133. The levers 147 are notched as shown at 153 for cooperation with a knife-edge bearing 155 of adjustable heads 157 on the pins 117 (see Fig. 2). Thus when the levers 147 are rotated clockwise (Fig. 1), they move the pins 117 to the right (Fig. 1), thus drawing over the ring 115 into which they are threaded. Since the clutch disc 105 is between rings 115 and 123, it may thus be clutched or released.

Movement of the levers 147 is accomplished by contacting their ends 159 with a flange 161 forming part of a control tube 163. This tube at its other (right) end is attached to a bell 165 which in turn is attached to the outer race of a ball bearing 167.

From the above it will be clear that the clutch plates 99 and 105 are clutched or declutched from the axial movements of the ball bearings 145 and 167 respectively. Thus when the ball bearing 145 is moved to the left, there is a closing in on the clutch disc 99 which drives the second-speed tube 87. When the ball bearing 145 moves to the right this clutch disc 99 is released. When the other ball bearing 167 moves to the right, there is a closing in on the clutch plate 105 which drives the low-speed shaft 19. When bearing 167 moves to the left this clutch plate 105 is released.

For brevity hereinafter, the clutch parts which are operated by the levers 147 will be referred to as clutch A (for shaft 19) and those operated by the levers 130 will be referred to as clutch B (for tube 87).

Control of the axial movement of the ball bearings 145 and 167 is obtained as follows: The inner race of the bearing 145 is affixed to a control sleeve 169 and the inner race of the bearing 167 is affixed to a control sleeve 171. These sleeves 169 and 171 are positioned around a sleeve 173 having a central stop 175. This sleeve 173 is attached to an extension sleeve 177 extending from the housing part 133. The sleeve 163 above described in connection with bell 165 is rotary between the sleeve 177 and the drive tube 87. The extension sleeve 177 and the attached control sleeve 173 are always rotary with the clutch housing, that is to say, with the driving parts of the clutches A and B.

The outside of the sleeve 173 is helically threaded with semi-circular grooves 174 and 178. Likewise, the insides of the control sleeves 169 and 171 are threaded as at 176 and 180. The pitches of the threads 174 and 176 are equal and right-handed; those of 178 and 180 equal and left-handed. The semi-circular grooves thus produce complementary helical channels into which interfitting ball bearings 179 are located. In other words, the sleeve 173 and the control sleeves 169 and 171, respectively, are connected by anti-friction ball-bearing thread means, sometimes referred to generically as an Edison screw.

Thus if, while the control sleeve 173 rotates clockwise, either control sleeve 169 or 171 is retarded, the resulting relative angular movement will cause a threading action of either sleeve 169 or 171 away from the stop 175. The resulting axial movement of the control sleeve 169 controls the levers 130 through bearing 145 to close clutch B; and the resulting axial movement of the sleeve 171 through bell 165 and sleeve 163 controls the levers 147 to close clutch A. If the rotations of control sleeves 169 and 171 are not retarded, these will tend to rotate with the sleeve 173. The helical threads are frictionless enough, and of enough pitch that under these conditions the clutch opening pressure from springs 127 will, through the levers 129 and 147 and appurtenant parts, drive the control sleeves 169 and 171 back against the central stop 175.

Contolled retardation of the control sleeves 169 and 171 is obtained electrically as follows: Sleeve 169 has attached thereto a magnetic eddy-current conductive ring 181. Sleeve 171 likewise has attached thereto a magnetic eddy-current conductive ring 183. Electric brake control means for the ring 181 is provided by a peripheral electromagnetic coil 185 which is within the confines of a two-piece magnetic housing 187 having alternating pole-forming teeth 189 and 191 which extend within the coil. These teeth 189 and 191 overlap axially and are spaced peripherally. Being in a toric flux field circuit of the coil 185 (see the dash lines 193; Fig. 2), these teeth become alternately north and south. The flux field passing between alternate teeth also passes through the magnetic material of the ring 181. Thus rotation of the ring is resisted in proportion to the energization of the coil 185, this being due to the magnetic reaction from the engendered eddy currents. When rotation is resisted, the ring threads out from the stop 175. The closing action of clutch B is therefore under control of current in the coil 185. With light current the clutch closure force is light; and with heavy current the closing force is stronger.

Likewise, the ring 183 has surrounding it an electromagnetic coil 195 located in a two-part circular magnetic member 197 having alternating polar teeth 199 and 201, which reach under the coil 195 and in that region overlap axially and are spaced peripherally. As above described in connection with coil 85, the toric flux field from coil 195 forms alternate north and south poles in the teeth 199, 201, the flux circuit closing through the ring 183 and inducing a magnetic drag according to the energization of the coil 195. In the case of both rings 181 and 183 the drag action is caused by the reactive flux from induced eddy currents by relative motions of the rings with respect to their respective fields.

The assembly of coil 185 and ring 187, and also the assembly of coil 195 and ring 197 are attached to a stationary support 203 extending from an interior wall part 205 of the housing part 1.

Attached to the other side of the wall 205 and located within the rotary brake drum 91 is a stationary assembly indicated generally at numeral 207. This assembly is constituted by a central stationary magnetic ring 209, within which is said bearing 93. It will be remembered that the brake drum 91 is rotary in said bearing 93 with the tube 87. The ring 209 has bolted to opposite sides magnetic rings 211 and 213. The bolts 215 which hold the ring 211 also support the ring 209 with respect to the wall 205. The bolts 217 hold the ring 213 to the ring 209. This assembly provides annular spaces 218 and 220 for annular electromagnetic coils 219 and 221 respectively. The ring 209 is provided with central, radially extending, peripherally spaced polar teeth 223. These have opposite extensions 225 and 226 over the coils 219 and 221 respectively. The ring 211 also has peripherally spaced polar teeth 227 having axial extensions 229 which alternate with the extensions 225 (Figs. 7 and 8). These extensions 225 and 229 thus alternate peripherally. Likewise, the ring 213 has polar teeth 231 with extensions 235 over the coil 221. The extensions 235 axially lap the extensions 226 and alternate with them peripherally. The coils 219 and 221 are so wound that the toric flux fields therefrom (dash lines 216 in Fig. 2) make all of the teeth 223 (including extensions 225 and 226) of one polarity and the teeth 227 and 231 of another polarity so that around the outside of each coil are alternating north and south magnetic poles. The flux flowing out of the north poles traverses the magnetic drum 91 and then leaves this drum and enters adjacent south poles. Therefore under conditions of relative rotation between the brake drum 91 and the field member 209, eddy currents are engendered in the drum which produce a reactive field effecting a retarding action. The retardation increases with increased current carried by the coils 219 and 221.

Around the brake drum 91 is located a friction brake band 233 which is anchored to the stationary member 3 at the anchor 236 (see Fig. 7). The other end 237 of this brake band is controlled from a lever 239 pivoted at 238 to the case 3. The lever 239 has connected thereto a control rod 241 which reaches to suitable manual brake-setting means.

Around the rotary outer cage 35 are formed teeth 243 for engagement by a dog 245 of a plunger 247. A spring 248 normally biases the plunger so as to disengage the dog 245. On the top of this plunger is an extension 249 operable by means of a translation cam 251 for forcing the plunger into a position wherein the dog 245 will interlock with the teeth 243. A rod 253 of which the cam 251 forms a part is connected through a suitable mechanical linkage 252 with a manual control lever 292 (Fig. 14).

*Electro-mechanical operation*

The electro-mechanical operation of the device, exclusive of circuit controls, is as follows, in which schematic Fig. 16 should be followed with the other pertinent figures, particularly 1, 2 and 3:

In neutral or disconnected position, the clutches A and B are open. Coils 185, 195, 219 and 221 are deenergized. Under these conditions the flywheel 11, ring 111, clutch cover 133, extension sleeve 177, sleeve 173, control sleeves 169, 171 (against stop 175), rings 181, and 183 all rotate. With these parts rotate the driving parts of the clutch, including rings 115, 123, 125, the levers 130, 147 and associated parts. But the clutch plates 99 and 105 do not rotate because the clutches are open. Hence neither the shaft 19 nor the sleeve 87 is driven. The clutch control rings 181 and 183 rotate freely with the clutch case because there is no electromagnetic braking action from the deenergized field coils 185 and 195.

Under the above conditions springs 127 move the levers 130 and 147 so as to bring the sleeves 169 and 171 against the stop 175. It will be remembered that the pitch on the threads on members 173, 169 and 171 is enough that the force on the levers from the springs 127 will permit threading down of said sleeves 169 and 171 to the stop 175. The portions of the threads 174 under control sleeve 169 are right-handed; those under the control sleeve 171 are left-handed, it will be recalled.

For low-speed operation (highest torque), clutch A is closed by energizing the coil 195. Clutch B is open, coil 185 deenergized. Such energization of coil 195 causes a flux circuit through the lapped portions of the teeth 199, 201 and through the ring 183, resisting the free angular motion of the latter. This causes axial left-hand threading of the sleeve 171 to the endwise position shown, which through bell 165 and tube 163 and flange 161 rotates the levers 147 clockwise. Thus through the fulcrums 155 and the bolts 117 the ring 115 is moved toward the ring 123, thus gradually frictionally gripping the clutch plate 105 so that the latter gradually picks up speed. Finally the clutch locks fully engaged and the mechanical drive is then from clutch plate A, low-speed shaft 19 (Fig. 16), sun gear 75, planetary gears 71, which gears 71, since the quill 25 is initially stationary, tend to drive the internal gear 73 counterclockwise with respect to the rotation of the shaft 19. Gear 73 being a part of the outer cage 35 tends to drive the latter backwards but such backward rotation is resisted by the one-way brake 55. Therefore the planetary gears 71 react on gear 73 as a fixed fulcrum and drive the planetary arm member 67 which in turn drives the quill 25 at reduced angular velocity and correspondingly increased torque. An exemplary speed ratio of shaft 19 to quill 25 might be 3:1 corresponding to a torque ratio of 1:3. It will be noted that under these conditions the member 77 rotates along with the annular gear 79. That is, what has been identified as the inner cage 67, 77 rotates. This drives the gears 81, 85, tube 87, brake drum 91, and the clutch plate 99. Since, however, the clutch B is at this time open and coils 219, 221 are deenergized, this constitutes a mere parasitic rotation without any substantial parasitic drag. Gears 79, 81 and 85 operate as a simple train, all their axes being fixed under the stated conditions.

It is emphasized that with the tube 87 rotates the brake drum 91. For second or intermediate-speed operation, the coils 219, 221 are next energized, the energization of coil 195 being unchanged, whereupon the flux field circuits from the teeth ends 225, 229; 226, 235 engender eddy currents in the drum 91, thus slowing it. This amounts to an electric clutch action. Thus gears 81, instead of freely driving the gear 85 with sleeve 87, now act against gear 85 as a resisting fulcrum. The reaction point for the system is then transferred from the one-way brake 55 to the electric brake drum 91. This will best be understood by considering a limiting condition in which the brake drum 91 is stationary, although this limiting condition in fact does not quite occur. In fact, the brake drum 91 is slowed considerably but not stopped, since some relative motion is required between it and the stationary fields from the windings 219 and 221 in order to generate the necessary eddy currents for providing the flux interaction which provides the necessary reacting torque. But whether drum 91 stops entirely or only approaches that condition is a matter which does not affect the principle. This principle is that the gear 85 then becomes a fixed, or more nearly fixed fulcrum.

Thus when the change is made from low speed to second or intermediate speed, the braking of the drum 91 causes the former idling action (in low speed) of the inner cage 77, 67, through the gear train 79, 81, 85, to the drum 91, to be blocked, and converted into an epicyclic action of this train. Gear 85 is then more or less blocked, being connected with the drum 91. The gear 85 then becomes a more nearly fixed fulcrum. Thus (Fig. 16) rolling action of planetary gears 71 within 73 pulls along cage 67, 77 and internal gear 79. This rolls planetary gears 81 around partially blocked gear 85, thus revolving pins 83 and rotating forward member 39 and the outer cage 35. Thus this epicyclic action advances the outer cage 35 so that the ring gear 73 (which in low gear was a stationary fulcrum for gear 71) in second speed becomes an additional advancing fulcrum. As a result the roller brake 55 releases, since it resists only backward movement of the sleeve 43 connected to the outer cage 35 and does not resist forward movement thereof. Thus the effect of the resisting fulcrum at gear 85, and the advancing fulcrum at gear 73 increases the speed of the quill 25 and inversely decreases the torque. An exemplary speed ratio in second speed of shaft 19 to quill 25 might be 3:2 corresponding to a torque ratio of 2:3. Thus second or intermediate speed is obtained. The exact ratio at any instant depends upon the rate at which drum 91 is allowed to move by the electric brake constituted by the flux from coils 219, 221.

For high-speed operation the clutch B is closed by energizing the coil 185 while coils 219 and 221 are deenergized, thus again freeing the brake drum 91 for idling action. With both clutches A and B thus closed, the shaft 19 and the sleeve 87 operate at the same speed with the result that the gears 85 and 75 are relatively locked. The result is that both the inner cage 77, 67 and the outer cage 35 are relatively locked and rotate together as a group, and the quill 25 is therefore driven at the angular velocity of the flywheel 11. In other words, this is a straight-through drive at 1:1 speed and torque ratio, without change through the transmission.

For reverse rotation of the quill 25 relatively to the rotation of the flywheel 11 the dog 245, by operating lever 292 to reverse position R (Fig. 14) is brought into interlocking relationship with the teeth 243, thus locking the outer cage 35 which makes roller brake 55 functionless. At this time clutch B remains closed, coil 185 being energized but at this time coil 195 is deenergized thus allowing opening of the clutch A. At this time the coils 219 and 221 are in deenergized condition. The result is that only the sleeve 87 is driven from the flywheel 11. At this time there is no resistance at the electric brake drum 91. Clockwise rotation of the gear 85 drives the gears 81 counterclockwise, thus driving the gear 79 counterclockwise, along with the inner cage 77, 67 which drives the quill 25 backward according to the gear ratio determined by gears 85, 81, 79, which act as a simple non-epicyclic train. They act as a simple train because the outer cage 35 is at this time locked by the dog 245. At this time the gears 71 are rolling epicyclically within the then fixed gear 73 and driving the gear 75 counterclockwise. This drives the shaft 19 counterclockwise along with the plate of clutch A, but since clutch A is open this is a mere idling action of these parts without parasitic drag.

The velocity ratio in reverse is of the order of that in low speed (about 3:1) and is determined by the ratio of the pitch radii of gears 85, 81 and 79. The torque ratio in reverse is of course the inverse of the velocity ratio (about 1:3).

The purpose of the overrunning clutch 17 is to allow for cranking the engine from the quill 25, for example when the battery is dead in an automobile in which the transmission is located. Thus the automobile may be pushed on the road to crank the engine. Since the car is usually pushed forward under such conditions and low gear connection is not wanted because of its unfavorable reverse torque, the manually-operated brake band 233 is provided. This locks the drum 91 by a manual setting. The outer cage 35 is at this time not locked at 243. Clutch A is open, but clutch 17 takes its place. Clutch B is open. The gears then operate as follows (Fig. 16):

Cage 67, 77 moves clockwise, rolling gears 71 within gear 73. Since the motion of gear 75 is at this time resisted, gear 73 tends to be driven clockwise which carries along 77, 79, thus rolling gears 81 on locked gear 85. This causes gears 81 to advance pins 83 clockwise, carrying along cage 35, which provides a moving fulcrum for gears 71, with the result that they drive gears 75 clockwise. The gear ratio is approximately equal to that of second-speed operation, the only difference being that due to a slipping braked condition of 85 (in second), as compared to a completely braked condition of it (in cranking).

The gear section of the device is provided with a suitable charge of lubricant which is kept in circulation by the operation of the gears. The lubricant is guided into the proper channels by channeling members such as 255, 257, 259 and centrifugally-operative circular channel members 261, 263 and 265. The details of these items and their cooperation are not discussed herein. They do not form part of the invention per se.

Electric controls

In Fig. 14 is shown an electric circuit for control purposes. Before describing this it should be observed that it is intended that the clutch A for low-speed operation is to be engaged simply by speeding up the engine, in order to give the same effect as if the car were started by means of a centrifugally-operated clutch responding to engine speed. Experience has shown us that very smooth starting action can be obtained when using a centrifugal clutch control in low speed. However, centrifugal clutches do not operate satisfactorily for second and high-speed operations. Many times a car is called upon to operate under full engine torque in second and high speeds. If for example a hill is slightly steeper than it should be for the gear ratio involved in second or high, the car will slow down until the clutch begins to slip but a centrifugal clutch, if used, will not permit the engine to stall. Therefore the clutch continues to slip until the friction surfaces burn out. Such a condition is seldom, if ever, encountered in low gear. Therefore, a centrifugal clutch is satisfactory for low gear but is not proper for second or high gear.

The present transmission obtains the equivalent of the smooth action of a centrifugally-operated clutch in low gear, but it is actuated by means of an electric relay system.

It is also important preliminarily to observe that intermediate or second speed should be permitted to take effect at other than a fixed road speed, that is, the governor used should only prepare for second-speed operation pending fulfillment of other desirable conditions. For example, when accelerating rapidly, the point at which second speed should come into operation is to be automatically determined by manifold pressure drop. Thus the point at which intermediate speed comes into operation is to be controlled by such pressure drop (vacuum increase) and the car speed at which the second gear connection is made depends upon the rate of acceleration and the throttle position. The greater the throttle opening, the higher the car speed will be before second speed engages. Once second speed is engaged, it should lock in. This is done by means of a contact in an electrical control circuit.

The statements above made in the reference to the engagement of intermediate speed also apply to a certain extent to the engagement of high speed. Arrangement is also made so that when the throttle control (gas pedal) is fully depressed high speed cannot engage at all. However, by a slight release of the gas pedal it (high speed) is engaged, provided the manifold vacuum in the engine is high enough. Otherwise the engaging of high speed is similar to that of second and is covered by similar operating factors.

Provision is also made so that once high-speed operation is brought about, it will continue until the car speed drops to 8 M. P. H. or less, unless the gas pedal (throttle) is opened sufficiently for a quick pickup. Lower-speed operation will occur automatically under the latter conditions if the gas pedal is depressed far enough. In addition, a selection occurs at this time of low or second speed depending upon the car speed. Low speed will take effect below 8 M. P. H. and second speed above 8 M. P. H. The effect depends upon a governor switch responsive to propeller shaft operation.

Reference to Fig. 14 will make the above matters clear. In this figure auxiliary shaft 267 is driven from the engine, that is, its speed is proportional to engine speed. A cross bar 269 attached to the shaft 267 has pivots 271 for centrifugally-operated weights 273. The right-hand ends of the weights tend to fly outward with increased speed and the left-hand ends press against springs 275. Each weight includes a lug 277 which, as the weights move outward, axially moves a sleeve 279. Attached to the sleeve 279 is the conducting pressure plate 281 of a carbon pile 283. The other conducting stationary plate of the pile is shown at 285. As the speed increases the resistance of the pile decreases.

The car battery is shown at 287 and the engine ignition switch at 289, these supplying point 286 in the circuit shown.

The carbon pile 283 is in the circuit 287, 289, wires 291, 293, point 288, wires 295, switch 297, wires 299, control coil 195 of clutch A and wire 301 to ground, thus closing a circuit. This is shown by solid arrows. As the pedal 303 is manipulated to open the engine throttle, and so long as switch 297 is closed, the coil 195 is increasingly energized with acceleration of the engine and car. As the engine speed increases, the centrifugal governor reduces the resistance in the carbon pile 283 and thus clutch A is smoothly closed.

The switch 297 is one of a set of manually set switches 297, 329, 351 and 367, all operated from a single control bar 290. This bar is controlled from a manually-operated lever 292 which has a forward position F shown in which switches 351, 297, 329 are shut when switch 367 is open. This lever 292 also has a reverse position R in which, when switch 367 is closed, switches 351, 297 and 329 are open. It also has a neutral position N in which all of these switches are open.

At 305 is shown one of a set of governor switches (305, 337 and 339) which are responsive to car speed, being driven from the take-off drive associated with gear 65. The details of the governor mechanisms are unnecessary, since such are well-known, being operated by centrifugal means, similar to that shown in connection with the carbon pile 283.

The switch 305 closes at 12 M. P. H. and reopens at 8 M. P. H. Switch 337 closes at 20 M. P. H. and opens at 8 M. P. H. Switch 339 closes at 20 M. P. H. and opens at 8 M. P. H. These switches all prepare their respective circuits for operation at the proper speeds.

A vacuum-controlled switch 307 has an operating stem 309 extending to a head 311 which is normally held up a rocker 312 and spring 314. The stem 309 carries an operating element of a switch 316. Switch 316 closes with switch 307. A plunger 313 is operated from a rocker 315 pivoting at 317. A spring 319 normally biases the rocker clockwise to lift the plunger 313. A vacuum bellows 321 connected by a line 323 to the engine intake manifold causes counter-clockwise movement of the rocker 315 according to pressure drop in the manifold, thus tending to close switches 307 and 316.

Switches 327 and 372 are magnetic contactor switches.

Second or intermediate speed may normally be brought about at about the time when the car reaches 12 M. P. H. under low-speed conditions. Then the governor switch 305 closes and the following circuit (shown by dotted arrows) is energized: point 286, wire 325, closed switch 327 (biased shut by spring 328), switch 329, wires 331 including the closed governor switch 305 and switch 307 (which will be closed, provided the manifold pressure has been reduced enough), wire 333, coils 219, 221 and wires 335, 301 to ground. It will be recalled that mechanically in order to go into intermediate speed from low speed it is not necessary to deenergize the coil 195 or open the clutch A, but rather that clutch A shall remain shut. Normally at 12 M. P. H. in low speed, the vacuum in 321 is enough to hold switch 307 shut but if the operator has the throttle open wider than normal, thus tending to break the vacuum, second-speed operation may be delayed, pending closure of switch 307 which awaits vacuum increase (pressure decrease) with increase of engine speed at the given throttle position. The magnetic contactor switch 372, which is connected across switch 307 by wires 362 and has a holding coil 368 connected across coils 219 and 221 by wires 369, serves to hold this circuit even though switch 307 should reopen. This prevents the nuisance of having the speed drop back to low from second, once the latter has been engaged, even when the throttle is opened so wide that resulting increase in manifold pressure in 321 would cause reopening of switch 307. A spring 370 is used to bias switch 372 toward open position.

As the engine speeds up in second gear, the vacuum will increase (pressure decrease) in the bellows 321. High speed will then normally be inaugurated at 20 M. P. H. at which speed governor switches 337 and 339 close. Current then flows through the following circuit (shown by dashed arrows): Wire 341 which includes switch 337, part of wire 295, wire 343, a normally closed throttle switch 346 (the function of which will be given below), wire 345, time-delay reactor 347 (the function of which will be given below), wire 349, switch 351, switch 339, switch 316 (at this time normally closed by sufficient vacuum in bellows 321), holding coil 355, wire 357, control coil 185 of clutch B, and wire 359 to ground. Once the switch 316 is closed, it is held closed by the holding coil 355. The coil 360 of the magnetic contactor switch 327 is connected across coil 185 (see wires 362) and at this time opens the dotted arrow circuit through coil 219, 221.

The purpose of the reactor coil 347 is to provide a slight time delay for high-speed action while the switch 327 in the second-speed circuit is being drawn open.

Reverse connection is accomplished when the manually-operated shifting lever 292 is set to reverse position R, which opens the switches 297, 329 and 351 while closing switch 367 in a wire 369. This obviously directly re-energizes the coil 185 without current passing through 347, 351, 339, and 316, which closes clutch B. In this case switch 337 is open and wire 369 therefore receives its current from point 286 via the carbon pile 283 and point 288. Thus the control of car acceleration in reverse gear by carbon pile 283 is similar to the control in low gear. Switch 327 is held open by energization of the magnetic contactor coil 360. The lever 292 is linked with member 253 and when lever 292 is in reverse position R the dog 245 engages teeth 243. This supplies the proper mechanical conditions for reversing the gear train, as above made clear.

The pedal-operated throttle switch 346 is in the high-speed (dashed-arrow) circuit, condenser 377 being connected across it for reducing arcing. This switch 346 is adapted to be opened by a tab 379 on the accelerator pedal 303. Opening occurs after the pedal has reached the dotted-line position shown, against a spring 381. When the pedal 303 engages the spring 381 the operator is warned that the switch 346 will open with its attendant results. These results are that the high-speed (dashed-arrow) circuit will be opened which causes the second-speed (dotted-arrow) circuit to come into operation through closing of switch 327. This occurs as soon as the engine speeds up, due to the increased throttle opening, and as the engine speeds up under these conditions the manifold pressure in 321 rises to bring about the necessary closure of switch 307 in the said second-speed circuit. Thus the switch 346 provides means, under emergency running conditions on the road, for obtaining a second-speed connection and torque.

A slight release on the pedal 303 away from the spring will close switch 346, and then if the manifold vacuum is proper switch 316 will close and energize high speed.

It should also be noted that either low or second speed will become effective automatically upon depressing the pedal 303 for quick pickup, if spring 381 is depressed sufficiently to permit lever 379 to open contact 346. Whether low speed or second speed engages depends on the car speed. Low speed will be engaged below 8 M. P. H. due to the propeller-shaft-responsive governor switch 305 opening below 8 M. P. H which prevents the coils 219, 221 of brake 91 from being energized. Under such conditions only the coil 195 of clutch A will be energized which provides the mechanical conditions for low speed. Above 8 M. P. H., assuming switch 305 to have been previously closed, second speed will be engaged, due to the closed condition of the switch 305.

The magnetic contactor switch 372 is to prevent the switch 307 from deenergizing the second-speed (dotted-arrow) circuit until high speed is energized at which time the magnetic contactor switch 327 opens the second-speed circuit. The switch 372 when energized, and shunting switch 307, prevent the opening and closing of switch 307 by bellows 321 from affecting the operation of the car. Thus the effect of the vacuum bellows 321 is limited to delaying institution of second-speed operation (after low-speed operation) not only until 12 M. P. H. car speed has been reached, but also until a sufficient manifold vacuum has been obtained in bellows 321, under the existing throttle conditions, to provide engine torque enough to operate in second speed. In other words, in changing from low speed to second speed the speed-responsive means is overridden when necessary by the vacuum-responsive means to provide a delayed shift.

*Conclusion*

Fig. 15 is a chart of operations of the most significant elements in the above description. The chart shows the conditions of the various significant structural elements in terms of the various speeds of the quill 25 (including neutral).

Reference has been made above to the fact that the engine can be started by pushing the car even though the battery be dead. It will be appreciated that once an engine is thus started, the generator charge into the battery will usually be sufficient to supply the needs of the electrical control circuit so that the latter will from then on control the transmission. Thus the car may be brought under its own power into a point where the battery may be repaired or replaced. As above made clear, starting by pushing requires the setting of the brake band 233 which is done from any suitable auxiliary lever or pedal.

It is believed that most of the advantages of the invention will be clear from the above but in addition it should be noted that former automatic transmissions incorporating planetary gears and depending upon mechanical means of locking the gear trains in and out were subjected to considerable parasitic drag due to overlapping activities of brake and clutch means. It was always difficult to adjust these so that the overlap would be a minimum and it was impractical to do without it. This parasitic drag is avoided in the present transmission because the transfer from one speed to another is accomplished instantaneously by electrical means without overlap and without delay in applying torque. For instance, transfer from second speed to high speed, or vice versa, is made with a high degree of precision by coordination of switches such as 327, 337 and 339, the former opening almost at the instant that the latter close. Therefore no parasitic drag occurs, nor is there any undue speed loss in changing speeds in the case of the present transmission.

It will be appreciated by those skilled in the art that although we show helical gears in the compound epicyclic gear train used, straight spur gears may be used, and that the same principles may be carried out in the train by means of bevel gears or other equivalent gears for the purpose.

The term cage as used herein for members 77, 67 and 37 is not to be taken as limited to the particular physical embodiments of these members as shown. The term is used in the sense that these members support gears 79 and 73 which are mounted concentrically with the quill 25. It will be observed that these cages also perform functions of epicyclic arms inasmuch as they respectively support the pins 83 and 69 for the planetary gears 81 and 71.

In the following claims the terms compound epicyclic gear means, and compound planetary gear means, have reference to the fact that the driving member 11 drives the gear train from two sources (the shaft 19 and shaft 87) and that the two sun and planet gear systems in the gear train react upon one another in various ways under various conditions of clutch and brake energizations to produce the various operating speeds and torques. Broadly speaking, this construction accounts for the fact that the present transmission involves so few parts, those that are employed being quite easy to manufacture at low cost.

Another point of moment is the high production of resisting torque that may be obtained by the overlapping toothed constructions of the magnetic circuit members 187, 197, 211, 209 and 213. The reason for the high torque-producing efficiency of such overlapped toothed constructions is disclosed in the United States Patent 2,367,636 of Martin P. Winther, dated January 16, 1945. Such efficiency is desirable in order to obtain sharply defined control characteristics.

In view of the above, it will be seen that the several objects of the invention are achieved and other advantageous results attained.

As many changes could be made in the above constructions without departing from the scope

We claim:

1. In a transmission for use between a prime mover and a driven member, a first sun gear on a first driver, a planetary gear meshing therewith, a rotary driven arm attached to the driven member and carrying said planetary gear, a first ring gear meshing with said planetary gear, a one-way-locking brake associated with said ring gear, a second sun gear on a second driver, a second planetary gear meshing with said second sun gear, a second ring gear meshing with said second planetary gear, said second ring gear being attached to said driven arm and under control of the first planetary gear, supporting means for the second planetary gear on the first ring gear, independently operable clutches for driving said sun gears independently or together, a brake for said second sun gear, means responsive to speed of the prime mover for first closing in the clutch of the first sun gear, means responsive to the speed of the driven member for applying said last-named brake without opening the last-named clutch, and means responsive to a higher speed of the driven member for releasing said last-named brake and closing the clutch of the second sun gear without opening the clutch of the first sun gear.

2. In a transmission for use between a prime mover and a driven member, a first sun gear on a first driver, a planetary gear meshing therewith, a rotary driven arm attached to the driven member and carrying said planetary gear, a first ring gear meshing with said planetary gear, a one-way-locking brake associated with said ring gear, a selective lock for the ring gear, a second sun gear on a second driver, a second planetary gear meshing with said second sun gear, a second ring gear meshing with said second planetary gear, said second ring gear being attached to said driven arm and under control of the first planetary gear, supporting means for the second planetary gear on the first ring gear, independently operable clutches for driving said sun gears independently or together, a brake for said second sun gear, means responsive to speed of the prime mover for first closing in the clutch of the first sun gear, means responsive to speed of the driven member for applying said last-named brake without opening the last-named clutch, means responsive to a higher speed of the driven member for releasing said last-named brake and closing the clutch of the second sun gear without opening the clutch of the first sun gear, and means for closing the second sun gear clutch without setting the last-named brake while setting the selective lock of the first ring gear.

3. In a compound epicyclic transmission, a first sun gear on a first driver, a planetary gear meshing therewith, a driven arm carrying said planetary gear, a ring gear meshing with said planetary gear, a reverse-locking brake associated with said ring gear, a second sun gear on a second driver, a second planetary gear meshing with said second sun gear, a second ring gear meshing with said second planetary gear, said second ring gear being attached to said driven arm and under control of the first planetary gear, supporting means for the second planetary gear on the first ring gear, means for driving said sun gears independently or together, a brake for said second sun gear, the pivotal supports for both sets of planetary gears being within the points of meshing of said planetary gears with said ring gears, and means in addition to said reverse-locking brake for locking the first ring gear against rotation in either direction, said additional locking means producing reverse drive when said first-mentioned ring gear is locked and said second sun gear is driven.

4. A transmission comprising a driving element, first and second individually controlled clutches driven thereby, first and second individual driving means respectively extending from said clutches and being selectively operable thereby, a driven member, an overrunning clutch between the driving element and the first driving means, a first rotary gear cage, an automatic reverse-locking brake limiting motion of the cage to a direction with that of the driving element, a second rotary gear cage connected to the driven member, an epicyclic gear train connecting the driving member from the first clutch with said driven member through said second cage and adapted to act in geared conjunction with said first cage, an epicyclic gear train connecting the driving member from the second clutch with the first cage and adapted selectively to control its movements in the direction of motion of the driven member and acting in geared conjunction with said second cage, an electric brake controlling the rotation of said second driving member and an independent mechanical brake therefor, and an interlock for locking said first cage independently of said reverse-locking brake.

5. A transmission comprising a driving element, a pair of individually controlled clutches driven thereby, first and second individual driving members controlled by said clutches respectively, a driven member, a rotary gear cage, a reverse-locking brake limiting motion of the cage to a direction with the driving element, an epicyclic gear train connecting said first driving member with said driven member and reacting against said cage, said epicyclic gear train including a second gear cage rotary with the driven member, an epicyclic gear train connecting the second driving member and said second gear cage, a second brake controlling the rotation of said second driving member, control means responsive to the speed of the driving element for individually closing the clutch associated with the first driving member, and means responsive to the speed of the driven element for controlling operation of said second brake and the other clutch.

6. A transmission comprising a driving element, a pair of individually controlled electric clutches driven thereby, individual driving members controlled by said clutches respectively, a driven member, a rotary gear cage, a reverse-locking brake limiting motion of the cage to a direction with the driving element, a lock for said cage adapted to block its motion in any direction, an epicyclic gear train connecting one of said driving members with said driven member and reacting against said cage, said epicyclic gear train including a second gear cage rotary with the driven member, an epicyclic gear train connecting the other driving member and said second gear cage, an electric brake controlling the rotation of said second driving member, centrifugal means responsive to the speed of the driving element for individually moving the clutch associated with the first-mentioned driving member, means responsive to the speed of the driven element for controlling operation of said electric brake and the other clutch, and individual manual means for operating said lock.

7. A transmission comprising a driving element, a pair of individually electrically controlled clutches driven thereby, individual driving members respectively extending from said clutches and being selectively operable thereby and together, a driven member, a first rotary gear cage, an automatically operative reverse-locking brake limiting motion of the cage to a direction with that of the driving element, a second rotary gear cage connected to the driven member for equal rotation therewith, an epicyclic gear train connecting a first one of said driving members with said driven member through said second cage and adapted to act in geared conjunction with said first cage, an epicyclic gear train connecting the other driving member and the first cage selectively to control its movements in the direction of motion of the driven member and acting in geared conjunction with said second cage, an electric brake controlling the rotation of said second driving member, and a lock for locking said first cage independently of said reverse-locking brake whereby said epicyclic train from said second driving member operates as a reverse train with fixed axes to turn the driven member backwards when the first driving member is declutched.

8. A transmission comprising a driving element, first and second individually controlled clutches driven thereby, first and second individual driving members respectively extending from said clutches and being selectively operable thereby, a driven member, a first rotary gear cage, an automatic reverse-locking brake limiting motion of the cage to a direction with that of the driving element, a second rotary gear cage connected to the driven member, an epicyclic gear train connecting the driving member from the first clutch with said driven member through said second cage and adapted to act in geared conjunction wtih said first cage, an epicyclic gear train connecting the driving member from the second clutch with the first cage and adapted selectively to control its movements in the direction of motion of the driven member and acting in geared conjunction with said second cage, a brake controlling the rotation of said second driving member, a lock for locking said first cage independently of said reverse-locking brake whereby said epicyclic train from said second driving member operates as a reverse train with fixed axes to turn the driven member backwards when the first driving member is declutched, means for automatically first holding closed said first clutch for low-gear operation, then setting the brake for said second driving member before opening the first clutch thus providing for second-gear operation, substantially simultaneously releasing the last-named brake while holding closed both clutches for high-gear operation, and means simultaneously releasing the last-named brake and holding closed the second clutch while setting said lock for reverse-gear operation.

9. A transmission comprising a driving element, first and second individually electrically controlled clutches driven thereby, first and second individual driving members respectively extending from said clutches and being selectively operable thereby, a driven member, an overrunning clutch between the driving element and the driving member extending from the first clutch, a first rotary gear cage, an automatic reverse-locking brake limiting motion of the cage to a direction with that of the driving element, a second rotary gear cage connected to the driven member, an epicyclic gear train connecting the first driving member from the first clutch with said driven member through said second cage and adapted to act in geared conjunction with said first cage, an epicyclic gear train connecting the second driving member from the second clutch with the first cage and adapted selectively to control its movements in the direction of motion of the driven member and acting in geared conjunction with said second cage, an electrically controlled eddy-current brake controlling the rotation of said second driving member, a lack for locking said first cage independently of said reverse-locking brake whereby said epicyclic train from said second driving member operates as a reverse train with fixed axes to turn the driven member backwards when the first driving means is declutched, member for automatically first holding closed said first clutch for low-gear operation, then setting the electric brake before opening the first clutch thus providing for second-gear operation, substantially simultaneously releasing the electric brake while holding closed both clutches for high-gear operation, means for simultaneously releasing the electric brake and holding closed the second clutch while setting said lock for reverse-gear operation, and a non-electric brake element for said electric brake for use in connection with said second driving member to transfer torque from the driven member to the driving element through said overrunning clutch when the clutches and brake are released for lack of electric control current.

10. A transmission comprising a driving member, individually operable clutches driven thereby, a low-speed driver connected to one clutch, a second-speed driver connected to the other clutch, sun gears on said low and second-speed drivers, a driven member, a rotary gear cage, a reverse locking brake limiting motion of the gear cage in the direction of motion of said driving member, a lock for said gear cage adapted selectively to prevent any rotation thereof, a second gear cage attached to said driven member and carrying epicyclic gears meshing with the sun gear on the low-speed driving member and with the first-mentioned gear cage, epicyclic gears carried on said first-mentioned gear cage meshing with the sun gear on the second driving member and with the second gear cage, electromagnetic means for closing in the first clutch, a variable resisting circuit for said electromagnetic means responsive to speed change of the driving member for gradually closing in the clutch with speed increase, a control circuit for the electric brake, switch means therein responsive to a predetermined speed of the driven member for energizing said electric brake, electromagnetic means for operating the other clutch, a control circuit for said last-named means, means in said last-named control circuit responsive to speed of the driven member for closing the circuit to energize said second clutch, and means connecting the control circuit for the second clutch and the control circuit for said electric brake whereby the latter circuit is opened automatically whenever the former is closed.

11. A transmission comprising a driving member itself driven by a prime mover of the internal combustion type having a vacuum manifold, individually operable clutches driven thereby, a low-speed driver connected to one clutch, a second-speed driver connected to the other clutch, sun gears on said low and second-speed drivers, a driven member, a rotary gear cage, a reverse locking brake limiting motion of the gear cage in the direction of motion of said driving member, an interlock for said gear cage adapted selectively to prevent any rotation thereof, a second gear cage attached to said driven member and carrying epicyclic gears meshing with the sun gear on the low-speed driving member and with the first-mentioned gear cage, epicyclic gears carried on said first-mentioned gear cage meshing with the sun gear on the second-speed driving member and with the second gear cage, electromagnetic means for closing in the first clutch, a variable resisting circuit for said electromagnetic means responsive to speed change of the driving member for gradually closing in the clutch with speed increase, a control circuit for the electric brake, switch means therein responsive to a predetermined speed of the driven member for energizing said electric brake, electromagnetic means for operating the other clutch, a control crcuit for said last named means, means in said last-named control circuit responsive to speed of the driven member for closing the circuit to energize said second clutch, means connecting the control circuit for the second clutch and the control circuit for said electric brake whereby the latter circuit is opened whenever the former is closed, and means responsive to manifold vacuum of said prime mover for delaying closure of the circuit for operating the electric brake until a predetermined manifold vacuum is attained.

12. A transmission comprising a driving member itself driven by a prime mover of the internal combustion type having a vacuum manifold individually operable clutches driven thereby, a low-speed driver connected to one clutch, a second-speed driver connected to the other clutch, sun gears on said low and second-speed drivers, a driven member, a rotary gear cage, a reverse locking brake limiting motion of the gear cage in the direction of motion of said driving member, an interlock for said gear cage adapted selectively to prevent any rotation thereof, a second gear cage attached to said driven member and carrying epicyclic gears meshing with the sun gear on the low-speed driving member and with the first-mentioned gear cage, epicyclic gears carried on said first-mentioned gear cage meshing with the sun gear on the second-speed driving member and with the second gear cage, variable electromagnetic means for closing in the first clutch, a variable resisting circuit for said electromagnetic means responsive to speed change of the driving member for gradually closing in the clutch with speed increase, a control circuit for the electric brake, switch means therein responsive to a predetermined speed of the driven member for energizing said electric brake, electromagnetic means for operating the other clutch, a control circuit for said last-named means, means in said last-named control circuit responsive to speed of the driven member for closing the circuit to energize said second clutch, means connecting the control circuit for the second clutch and the control circuit for said electric brake whereby the latter circuit is opened whenever the former is closed, and means responsive to a predetermined manifold vacuum for delaying closure of the circuit for the electric brake above a predetermined manifold pressure, said last-named means also being operative upon the control circuit for said second clutch likewise to delay its closure.

13. A transmission comprising a driving member itself driven by a prime mover having a vacuum manifold and a throttle, individually operable clutches driven thereby, a low-speed driver connected to one clutch, a second-speed driver connected to the other clutch, sun gears on said low and second-speed drivers, a driven member, a rotary gear cage, a reverse-locking brake limiting motion of the gear cage in the direction of motion of said driving member, an interlock for said gear cage adapted selectively to prevent any rotation thereof, a second gear cage attached to said driven member and carrying epicyclic gears meshing with the sun gear on the low-speed driving member and with the first-mentioned gear cage, epicyclic gears carried on said first-mentioned gear cage meshing with the sun gear on the second-speed driving member and with the second gear cage, variable electromagnetic means for closing in the first clutch, a variable resisting circuit for said electromagnetic means responsive to speed of the driving member for gradually closing in the clutch with speed increase to produce low speed, a control circuit for the electric brake, switch means therein responsive to a predetermined speed of the driven member for energizing said electric brake to produce second speed, electromagnetic means for operating the other clutch, a control circuit for said last-named means, means in said last-named control circuit responsive to speed of the driven member for closing the circuit to energize said second clutch to produce high speed, means connecting the control circuit for the second clutch and the control circuit for said electric brake whereby the latter circuit is opened whenever the former is closed, means responsive to manifold vacuum of the prime mover for delaying closure of the circuit for the electric brake until a predetermined manifold vacuum is reached, said last-named means also being operative upon the control circuit for said second clutch, and means responsive to a predetermined throttle opening of said prime mover for breaking said circuit of the second clutch.

14. A transmission for an internal combustion engine which has a vacuum manifold, comprising a main driving means driven from said engine, a pair of individually operable clutches, plural driving members extending from the clutches, a driven member, compound epicyclic gear means connecting said plural driving members with said driven member, an electric brake associated with one driving member, the arrangement being such that closure of a first one of said clutches institutes low gear, while energization of said electric brake institutes second gear, and deenergization of said brake and closure of both clutches institutes high gear, means responsive to prime mover speed for closing in the low-speed clutch, means responsive to the speed of the driven member for energizing the brake to institute second-speed operation, said last-named means being also responsive to reduced manifold pressure of said prime mover to delay institution of second-speed operation, and means responsive to the speed of the driven member for instituting high-speed operation, said last-named means also being subject to delay determined by manifold pressure in the prime mover.

15. A transmission comprising a main driving means driven from an internal combustion engine having a vacuum manifold, a pair of individually operable clutches connected with the main driving means, driving members extending from the clutches, a driven member, compound epicyclic gear means connecting said driving members with said driven member, an electric brake connected with one of said driving members, the arrangement being such that closure of a first one of said clutches institutes low gear, while energization of said electric brake institutes second gear during the time that said first clutch remains closed, and deenergization of said brake and closure of both clutches institutes high gear, means responsive to prime mover speed for closing in the low-speed clutch to institute low speed, means responsive to the speed of the driven member for energizing the brake to institute second-speed operation, said last-named means being also responsive to reduced manifold pressure of said prime mover to delay institution of second-speed operation, means responsive to the driven member for instituting high-speed operation, said last-named means also being subject to delay determined by manifold pressure in the prime mover, means for deenergizing said electric brake when both of said clutches are closed, and means for maintaining the second-speed or high-speed operation respectively when once instituted independently of said manifold pressure.

16. A transmission comprising a main driving means driven from an internal combustion engine having a vacuum manifold and a throttle, a pair of individually operable clutches connected with the main driving means, driving means extending from the clutches, a driven member, compound epicyclic gear means connecting said driving members with said driven member, an electric brake connected with one of said driving members, the arrangement being such that closure of a first one of said clutches institutes low gear, while energization of said electric brake institutes second gear, and deenergization of said brake and closure of both clutches institutes high gear, means responsive to prime mover speed for closing in the low-speed clutch to institute low speed, means responsive to the speed of the driven member for energizing the brake to institute second-speed operation, said last-named means being also responsive to reduced manifold pressure of said prime mover to delay institution of second-speed operation, means responsive to speed of the driven member for instituting high-speed operation, said last-named means also being subject to delay determined by manifold pressure in the prime mover, means for deenergizing said electric brake when both of said clutches are closed, means for maintaining second-speed and high-speed operations respectively when once instituted independently of said manifold pressure, means responsive to a predetermined position of said throttle of said prime mover for opening the circuit to said high-speed clutch, and means responsive to opening of the last-named circuit whereby said electric brake automatically again becomes energized to institute second-speed operation.

17. An electrically controlled transmission adapted to be driven by a prime mover, comprising a first clutch, an electric clutch control coil therefor, a driven member, a gear train adapted to be driven by said prime mover through said first clutch to institute low-speed operation of said driven member when said clutch coil is energized to close the clutch, an electric brake adapted when actuated in conjunction with said first clutch when closed to modify the ratio of said gear train to institute second-speed operation, a control coil for said electric brake, a second clutch adapted when actuated to close in conjunction with said first clutch when closed further to couple the elements of said gear train to institute direct high-speed operation of said driven member, a control coil for said second clutch; a first circuit including said first clutch control coil and a rheostat responsive to prime mover speed adapted variably to actuate said first clutch; a second circuit adapted to actuate said electric brake including said brake coil, a first switch responsive to motion of said driven member to close at a predetermined speed, and a second normally closed switch; and a third circuit adapted to actuate said second clutch including said second clutch coil, a third switch responsive to speed of said driven member, and a magnetic coil operating said second switch, said second switch being responsive to energization of said magnetic coil to open said second circuit when said third circuit is completed.

18. An electrically controlled transmission adapted to be driven by a prime mover having a vacuum manifold, comprising a first clutch, an electric control coil therefor, a driven member, a gear train adapted to be driven by said prime mover through said first clutch to institute low-speed operation of said driven member when said clutch coil is energized to close the clutch, an electric brake adapted when actuated in conjunction with said first clutch to modify the ratio of said gear train to institute second-speed operation of said driven member, an electric brake control coil for said brake, a second clutch adapted when actuated to close in conjunction with said first clutch when closed further to modify the ratio of said gear train to institute high-speed operation of said driven member, a control coil for said second clutch; a first circuit including said first clutch coil and a rheostat responsive to prime mover speed adapted variably to actuate said first clutch; a second circuit adapted to energize said electric brake including said brake coil, a first switch responsive to motion of said driven member to close at a predetermined speed, a second switch responsive to manifold vacuum to delay energization of the brake coil until a predetermined manifold vacuum is reached, a magnetic holding switch across said last-named switch, and a third normally closed switch; and a third circuit adapted to actuate said second clutch including said second clutch coil, a fourth switch responsive to speed of the driven member for closing the circuit, a fifth switch responsive to manifold vacuum to close when said vacuum reaches a predetermined value, a holding coil for said last-named switch, and a magnetic coil responsive to energization of said third circuit to open said third switch to deenergize said second circuit.

19. An electrically controlled transmission adapted to be driven by a prime mover having a throttle, comprising a first clutch, an electric clutch control coil therefor, a driven member, a gear train adapted to be driven by said prime mover through said first clutch to institute low-speed operation of said driven member when said clutch coil is energized to close the clutch, an electric brake adapted when actuated in conjunction with said first clutch to modify the ratio of said gear train to institute second-speed operation, a coil for said electric brake, a second clutch adapted when actuated to close in conjunction with said first clutch when closed further to modify the ratio of said gear train to institute high-speed operation of said driven member, a control coil for said second clutch; a first circuit including said first clutch coil and a rheostat responsive to prime mover speed adapted variably to actuate said first clutch; a second circuit adapted to actuate said electric brake including said brake coil, a first switch responsive to motion of said driven member to close at a predetermined speed; and a second normally closed switch; a third circuit adapted to actuate said second clutch including said second clutch coil, a third switch responsive to speed of said driven member and a magnetic coil operative upon said second switch, said second switch being responsive to energization of said magnetic coil to open said second circuit when said third circuit is completed, and a throttle-operated switch in said third circuit adapted at a predetermined throttle opening to deenergize the third circuit and reenergize said second circuit to institute second-speed operation.

20. An electrically controlled transmission adapted to be driven by a prime mover, comprising a first clutch, an electric clutch control coil therefor, a driven member, a gear train adapted to be driven by said prime mover through said first clutch to institute low-speed operation of said driven member when said clutch coil is energized to close the clutch, an electric brake adapted when actuated in conjunction with said first clutch to modify the ratio of said gear train to institute second-speed operation, a control coil for said electric brake, a second clutch adapted when actuated to close in conjunction with said first clutch when closed further to modify the ratio of said gear train to institute high-speed operation of said driven member, a control coil for said second clutch; a first circuit including said first clutch coil and a rheostat responsive to prime mover speed adapted variably to actuate said first clutch; a second circuit adapted to actuate said electric brake including said brake coil, a first switch responsive to motion of said driven member to close at a predetermined speed, and a second normally closed switch; a third circuit adapted to actuate said second clutch including said second clutch coil, a third switch responsive to speed of said driven member and a magnetic coil operative upon said second switch, said second switch being responsive to energization of said magnetic coil to deactuate said electric brake when said third circuit is completed, and a gang of manually operated switches each in one of said circuits, manual operation being adapted substantially simultaneously to open the switches in all of said circuits.

21. An electrically controlled transmission adapted to be driven by a prime mover, comprising a first clutch, an electric clutch control coil therefor, a driven member, a gear train adapted to be driven by said prime mover through said first clutch to institute low-speed operation of said driven member when said clutch coil is energized to close the clutch, an electric brake adapted when actuated in conjunction with said first clutch to modify the ratio of said gear train to institute second-speed operation, a control coil for said electric brake, a second clutch adapted when actuated to close in conjunction with said first clutch when closed further to modify the ratio of said gear train to institute high-speed operation of said driven member, a control coil for said second clutch; a first circuit including said first clutch coil and a rheostat responsive to prime mover speed adapted variably to actuate said first clutch, a second circuit adapted to actuate said electric brake including said brake coil, a first switch responsive to motion of said driven member to close at a predetermined speed, and a second normally closed switch, a third circuit adapted to actuate said second clutch including said second clutch coil, a third switch responsive to speed of said driven member and a magnetic coil operative upon said second switch, said second switch being responsive to energization of said magneitc coil to deactuate said electric brake when said third circuit is completed; and a fourth circuit including said rheostat and said second clutch coil adapted to actuate only said second clutch to institute reverse-speed operation of said driven member.

22. A transmission comprising a main driving unit, a pair of first and second individually operable clutches adapted to be selectively driven by said driving unit, a first driving member extending from said first clutch and carrying a first sun gear, a second driving member extending from said second clutch and carrying a second sun gear and an electrically actuated brake, a first planetary gear meshed with said first sun gear, a driven rotary arm carrying said first planetary gear, a first ring gear meshed with said first planetary gear, a one-way locking brake associated with said ring gear, a second planetary gear meshed with said second sun gear, a second ring gear meshed with said second planetary gear, said second ring gear being attached to said driven rotary arm and being coordinated with the planetary action of said first planetary gear, and a cage supporting the second planetary gear on the first ring gear whereby said first ring gear is coordinated with the planetary action of said second planetary gear, a first electric coil associated with said first clutch responsive to the speed of said driving unit to actuate said first clutch, a second electric coil associated with said second clutch responsive to the speed of said driven member to actuate said second clutch, and an electric circuit including said electrically actuated brake responsive to speed of said driven member to actuate said brake.

23. A transmission for an internal combustion engine, comprising a main driving means driven from said engine, a pair of individually operable clutches, plural driving members extending from the clutches, a driven member, compound epicyclic gear means connecting said plural driving members with said driven member, an electric brake associated with one driving member, the arrangement being such that closure of a first one of said clutches institutes low-gear operation, while energization of said electric brake without opening the first clutch institutes second-gear operation, and deenergization of said brake and closure of both clutches institutes high-gear operation, a first electrical circuit responsive to prime mover speed for closing the low-gear clutch, a second electrical circuit responsive to the speed of the driven member for energizing the brake to institute second-gear operation, and a third electrical circuit responsive to the speed of the driven member for instituting high-gear operation.

24. A transmission for an internal combustion engine, comprising a main driving means driven from said engine, a pair of individually operable clutches, plural driving members extending from the clutches, a driven member, compound epicyclic gear means connecting said plural driving members with said driven member, an electric brake associated with one driving member, the arrangement being such that closure of a first one of said clutches institutes low-gear operation, while energization of said electric brake without opening the first clutch institutes second-gear operation, and deenergization of said brake and closure of both clutches institutes high-gear operation, while closure only of said second clutch institutes reverse-gear operation, a first electrical circuit responsive to prime mover speed for closing in the low-gear clutch, a second electrical circuit responsive to the speed of the driven member for energizing the brake to institute second-gear operation, a third electrical circuit responsive to the speed of the driven member for instituting high-gear operation, and a fourth electrical circuit for closing only said second clutch to institute reverse-gear operation.

MARTIN P. WINTHER.
ANTHONY WINTHER.

REFERENCES CITED

The following references are of record in the file of this patent:

UNITED STATES PATENTS

| Number | Name | Date |
|---|---|---|
| 1,609,782 | Small | Dec. 7, 1926 |
| 1,991,124 | Sharpe | Feb. 12, 1935 |
| 2,045,610 | Padgett | June 30, 1936 |
| 2,045,612 | Padgett | June 30, 1936 |
| 2,072,832 | Weydell | Mar. 2, 1937 |
| 2,085,607 | Bockwell | June 29, 1937 |
| 2,127,655 | Stromquist | Aug. 23, 1938 |
| 2,150,950 | Thoma | Mar. 11, 1939 |
| 2,229,336 | Neracher | Jan. 21, 1941 |
| 2,259,730 | Burtnett | Oct. 21, 1941 |
| 2,306,582 | Winther | Dec. 29, 1942 |
| 2,343,291 | Gilfillan | Mar. 7, 1944 |
| 2,376,545 | Livermore | May 22, 1945 |

FOREIGN PATENTS

| Number | Country | Date |
|---|---|---|
| 509,205 | Great Britain | July 12, 1939 |